US006982033B2

(12) United States Patent
Donald et al.

(10) Patent No.: US 6,982,033 B2
(45) Date of Patent: Jan. 3, 2006

(54) AEROBIC TREATMENT PLANT WITH FILTER PIPE

(76) Inventors: Hubbard H. Donald, 2247 Hwy. 151 N., Downsville, LA (US) 71234; George E. Johnson, 2247 Hwy. 151 N., Downsville, LA (US) 71234

( * ) Notice: Subject to any disclaimer, the term of this patent is extended or adjusted under 35 U.S.C. 154(b) by 0 days.

(21) Appl. No.: 10/195,109

(22) Filed: Jul. 12, 2002

(65) Prior Publication Data

US 2003/0029783 A1 Feb. 13, 2003

Related U.S. Application Data

(60) Provisional application No. 60/305,170, filed on Jul. 13, 2001.

(51) Int. Cl.
*C02F 3/00* (2006.01)

(52) U.S. Cl. ...................... 210/207; 210/220; 210/258; 210/252; 210/255; 210/532.2

(58) Field of Classification Search ................ 210/207, 210/220, 258, 252, 255, 532.2
See application file for complete search history.

(56) References Cited

U.S. PATENT DOCUMENTS 3,741,393 A 6/1973 Estes
4,608,157 A 8/1986 Graves
4,970,880 A * 11/1990 Luger .......................... 68/208
5,549,818 A 8/1996 McGrew, Jr.
5,569,387 A * 10/1996 Bowne et al. .............. 210/754
5,645,732 A * 7/1997 Daniels ...................... 210/747
5,885,452 A * 3/1999 Koteskey .................... 210/309
6,136,190 A * 10/2000 Zoeller et al. .............. 210/299

(Continued)

FOREIGN PATENT DOCUMENTS

JP 54-28277 * 3/1979

*Primary Examiner*—Chester T. Barry
(74) *Attorney, Agent, or Firm*—Phelps Dunbar, LLP

(57) ABSTRACT

The Aerobic Treatment Plant with Filter Pipe ("ATPFP") processes sewage for buildings not connected to a municipal sewer system. It employs a multi-stage process for cleaning sewage in a single, light-weight, easy-to-install unit. Sewage is initially cleaned in the aerobic tank, which is divided into an inner chamber and an outer chamber by a funnel-shaped clarifier hanging down in the aerobic tank, with the opening in the bottom of the clarifier held above the bottom of the aerobic tank. Air droplines hang down in the outer chamber of the aerobic tank, so that sewage in the outer chamber is aerated, stimulating aerobic microorganisms which digest the sewage. The sewage in the outer chamber then moves into the inner chamber inside the clarifier where gravity separates solids from the effluent. This cleaned effluent is then drained to the post-treatment tank for additional cleaning, where it may be chlorinated before it is filtered to screen out debris and then stored for discharge. The ATPFP utilizes a filter pipe to further clean effluent and to trap debris, and the design of the filter pipe allows for easy removal for cleaning, while maximizing the time between cleanings. Typically, the ATPFP employs a pump to discharge the cleaned effluent. The ATPFP uses a single cover to seal both tanks, adding structural support while simplifying manufacture. To reduce the weight, aiding in installation, while retaining the strength and durability needed for a sewage system, the ATPFP is generally made of fibreglass reinforced plastic, and the post-treatment tank is joined to the aerobic tank by a lamination process.

24 Claims, 5 Drawing Sheets

U.S. PATENT DOCUMENTS 6,180,004 B1 * 1/2001 Drewery .................. 210/221.2
6,183,630 B1 * 2/2001 Reeves ........................ 210/91
6,200,472 B1 * 3/2001 Donald et al. ........... 210/195.1
6,228,258 B1 5/2001 Donald
6,309,551 B1 * 10/2001 Suchecki et al. ........... 210/744
6,406,619 B1 6/2002 Donald
6,827,850 B2 12/2004 Donald

* cited by examiner

AEROBIC TREATMENT PLANT WITH FILTER PIPE

This application claims the benefit of U.S. Provisional Application No. 60/305,170 filing date Jul. 13, 2001

BACKGROUND OF THE INVENTION

This invention relates to the treatment of sewage. More particularly, this invention relates to the treatment of sewage discharged from houses and other buildings which are not connected to a municipal sewer system such that, after the sewage has passed through the Aerobic Treatment Plant with Filter Pipe ("ATPFP"), it has been cleaned to a level acceptable for discharge into the environment so that it will not contaminate the ground water. Thus, the ATPFP provides an alternative to septic systems for buildings constructed outside of a local municipal sewer system.

There are several versions of the conventional sewage treatment system which use aerobic microorganisms to break down sewage. One such device is seen in U.S. Pat. No. 5,549,818. This conventional sewage treatment device consists of a cylindrical tank which encompasses a funnel-shaped clarifier. The clarifier divides the cylindrical tank into an outer chamber, between the outer wall of the tank and the clarifier, and an inner chamber, inside the clarifier. Air is introduced into the outer chamber by multiple air droplines, which are connected to an air compressor and which pump air bubbles into the sewage in the outer chamber. Sewage flows into the outer chamber where it comes in contact with the air bubbles. The introduction of air facilitates the breakdown and digestion of the sewage by aerobic microorganisms present in the sewage. The aerated sewage then proceeds into the clarifier through an opening at the bottom of the funnel-shaped clarifier. Inside the clarifier is a quiescent zone. This area of calm in the inner chamber of the device allows for settling to occur, with the solids falling back out of the clarifier and collecting on the bottom of the treatment tank. Accordingly, the waste water becomes cleaner as it progresses upward in the funnel-shaped clarifier, continuing to allow gravity to separate the solids from the water. So, by the time the sewage has progressed up through the clarifier, it has been substantially cleaned. This treated effluent exits near the top of the clarifier and is discharged. This aerobic clarification process has also been combined with a second, post-treatment stage in an earlier invention by the present inventors, as seen in U.S. Pat. No. 6,228,258.

A common problem with such current devices has been that they often do not effectively remove floating debris from the effluent. This may result in a less than satisfactory effluent for discharge to the environment. It may also prevent the use of a pump to discharge the effluent, since the presence of debris would interfere with the operation of the pump mechanism, clogging the pump and requiring an undue amount of maintenance. These problems are amplified in systems which do not include a pre-treatment tank designed to trap trash. Thus, a need has arisen for a compact two-tank sewage treatment plant which effectively overcomes these concerns.

The present invention of the Aerobic Treatment Plant with Filter Pipe ("ATPFP") improves upon the basic aerobic clarification process for sewage by adding an integrated filter cleaning stage after aerobic clarification of the effluent in order to produce a better effluent, more suitable for discharge to the environment. The filter stage also acts to capture floating debris of the type which would hamper the effectiveness of a pump mechanism. Thus, the ATPFP is able to treat sewage more thoroughly than conventional devices, while also providing the benefits of pump-driven discharge of effluent (as for example, when the effluent is used for landscape hydration in an attached sprinkler system). In effect, the filter pipe of the ATPFP acts as both a filter mechanism and a trash trap mechanism simultaneously, allowing a single compact unit to address both of these important functions.

In the ATPFP, the sewage first proceeds through an aerobic tank, passing through an aeration chamber followed by a settling chamber in a clarifier. Then, in the second stage, the sewage enters a post-treatment area, where it is filtered and may also be chlorinated before discharge. Through this multi-step process, the ATPFP produces a cleaner effluent. The filter traps small floating particles left after the aerobic clarification process, so that the effluent being discharged to the environment is relatively free of debris and particulates. In addition to producing a cleaner effluent, this produces an effluent which can more easily be pumped out of the post-treatment area. The use of chlorine in the post-treatment tank also disinfects the effluent before discharge, ensuring that no disease carrying organisms, which could contaminate the ground water, are discharged from the ATPFP.

SUMMARY OF THE INVENTION

The ATPFP is a single device utilizing a multi-stage procedure for treating sewage. The ATPFP is comprised of an aerobic tank, in which the sewage is aerated to allow aerobic microorganisms to break down the sewage and then clarified as the heavier particles separate from the effluent, and a post-treatment tank, which filters and often chlorinates the effluent before discharge. The filter mechanism, in addition to further cleaning the effluent, also allows the ATPFP to effectively use a pump to discharge the cleaned effluent from the post-treatment tank, by trapping floating debris and trash which survived aerobic clarification and would clog the pump device. The two tanks are joined into a single unit, allowing for convenient installation.

The aerobic tank is a vessel with sidewalls and a bottom, and the top is sealed by a removable cover. The tank encompasses a funnel-shaped clarifier. The clarifier is wide near the top of the aerobic tank and narrows towards the bottom of the tank, and there is an opening in the bottom of the clarifier. There are many methods which could be used to hold the clarifier in place inside the aerobic tank. The ATPFP preferably uses a clarifier design with a lip that overhangs the sidewalls of the aerobic tank. Thus, the clarifier actually hangs down from the top of the sidewalls. The lip of the clarifier is held firmly in place between the top of the aerobic tank sidewalls and the cover for the aerobic tank. The funnel-shaped main body of the clarifier is offset slightly down from the top of the tank, so that there is a gap between the top of the clarifier and the top of the aerobic tank. This offset provides clearance for the air feed conduit. The clarifier hangs down inside the vessel, not reaching down to the bottom of the aerobic tank but leaving an area of clearance between the bottom of the clarifier and the bottom of the aerobic tank. Thus, the aerobic tank is divided into two chambers by the clarifier. Between the outer sidewalls of the aerobic tank and the clarifier is the outer chamber, where aeration of the sewage occurs, while the volume inside the clarifier is the inner chamber of the aerobic tank, where solid particles are gravity separated from the effluent.

Running down into the outer chamber of the aerobic tank from the top of the aerobic tank are droplines. These droplines are typically distributed in the outer chamber such that they provide for aeration throughout the upper part of the outer chamber, above the plane of the bottom of the clarifier. These droplines are conduits which are typically capped at the bottom end and which have small holes for emitting air. The top end of these droplines are connected to an air feed conduit which directs air from the compressor, so that the droplines will emit air bubbles into the outer chamber, aerating the sewage passing through the outer chamber of the aerobic tank. The inner chamber, located inside the clarifier, is screened from the aerating effect of the droplines by the walls of the clarifier, so this inner chamber is a non-turbulent, quiescent zone. Near the top of the inner chamber with its opening located inside the clarifier is an outlet drain leading to the post-treatment tank. Typically, the outlet drain is comprised of an outlet conduit, extending from the clarifier of the aerobic tank to the post-treatment tank, and a T-Baffle, which controls the flow of effluent into the outlet conduit. The T-Baffle is comprised of two T-joints. The first T-joint connects to the outlet conduit and extend upwards and downwards from the outlet conduit. The second T-joint connects to the bottom of the first T-joint, so that its two openings extend out perpendicularly from the openings of the first T-joint. The uppermost opening of the first T-joint extends above the fluid level within the clarifier, acting as a vent for the T-Baffle. Both of the openings for the second T-joint are beneath the fluid level within the clarifier. Thus, the effluent enters the T-Baffle through the two lower openings and then flows into the outlet conduit, out of the clarifier of the aerobic tank and into the post-treatment tank. Because a film of scum can form atop the liquid in the aerobic tank, the T-Baffle acts to drain effluent from beneath the surface of the fluid to provide for a cleaner effluent discharge from the aerobic tank.

The sewage enters the aerobic tank through an inlet port located near the top of the aerobic tank. The sewage moves into the outer chamber of the aerobic tank and descends downward through the outer chamber as additional sewage enters the aerobic tank through the inlet port. As the sewage descends, it passes through the air bubbles emitted from the drop lines. This excites the sewage, causing turbulent motion, as it aerates the sewage. Injecting air into the sewage activates and stimulates the aerobic microorganisms in the sewage. This causes the aerobic microorganisms to multiply and increases the amount of sewage that they digest. This aerobic process eliminates sewage contaminants to a great extent, cleaning the sewage. After passing through the aeration zone of the outer chamber of the aeration tank, the sewage enters a relatively calm zone below the air holes in the drop lines. Here, settling begins to occur, with heavier solids falling towards the bottom of the aerobic tank. The sewage in the quiescent zone is displaced upwards and through the opening in the bottom of the clarifier and into the inner chamber of the aerobic tank as more sewage enters the outer chamber of the aerobic tank. The sewage in the inner chamber is in a relatively calm state, and so contaminants, acted upon by gravity, will continue to settle downwards. In this way, the clarifier acts to screen out solid contaminants from the effluent. This continuous process results in a very clean effluent at the top of the inner chamber, where it is drained off by the T-Baffle and flows out of the aerobic tank through the outlet conduit and into the post-treatment tank.

The post-treatment tank has sidewalls and a bottom, and the top is sealed with a removable cover. Typically, the post-treatment tank has an approximately rectangular cross-section and is generally the same height as the aerobic tank. The outlet conduit enters the post-treatment tank near the top of the tank. There, it connects to a filter pipe, through which the effluent passes into the storage space of the post-treatment tank. By design, the filter pipe is removably connected to the outlet conduit, typically using a removable pin, so that the filter pipe can be easily detached for regular cleaning in order for the filtering process to remain effective. Optionally, the outlet conduit may be connected to the filter pipe via a chlorinator. In that case, the filter pipe is generally rigidly attached to the bottom of the chlorinator, and the chlorinator-filter pipe assembly is removably attached to the outlet conduit using a removable pin which is inserted through matching holes in the filter pipe assembly and the outlet conduit. Then, the effluent is chlorinated when passing through the chlorinator, generally by flowing across one or more chlorine tablets, before finally being filtered in preparation for discharge. Typically, the filter pipe has apertures through which the effluent flows into the post-treatment tank. Any debris or particulate matter in the clarified effluent which is larger than these apertures will be trapped inside the filter pipe and will not pass into the post-treatment tank. So, in the final stage of the ATPFP, the effluent has been aerobically clarified, filtered, and chlorinated, producing a substantially clean effluent suitable for direct discharge to the environment in accordance with various state health and environmental regulations. The cleaned effluent is typically held in the post-treatment tank until it rises to a level which activates a float switch, triggering a pump, which can be either internal or external, discharging the cleaned effluent.

For convenience, the ATPFP connects the post-treatment tank to the aerobic tank, creating a single unit which performs this multi-stage cleaning process for sewage. The top of the two tanks are capped to make the ATPFP a closed system. The cover cap for the aerobic tank is generally convex in shape (dome-shaped). This strengthens the aerobic tank from collapsing under the weight of the earth beneath which it is buried. The cover cap for the post-treatment tank may not be convex, since it is primarily a riser which extends above the earthen surface and so does not need reinforcement. Rather than individual cover caps for each tank, however, a single cover for the entire ATPFP device is preferred. This single cover needs to be formed so that it seals each tank individually, so that there can be no sewage gas transfer between the tanks. In addition, chlorine cannot be allowed to flow from the post-treatment tank to the aerobic tank (if an optional chlorinator is employed), as that would kill the aerobic microorganisms which are crucial to the cleaning process. The single cover is also preferably formed to incorporate a convex section over the aerobic tank for strength purposes. A portion of the cover for each tank can have a service hatch for maintenance. Generally, there is a riser extending from the top of the aerobic tank, allowing for inspection and cleaning of the aerobic tank. Also, there is generally a larger high riser on the post-treatment tank which allows for venting of air from the system. This larger riser also allows access for maintenance and regular cleaning of the filter pipe-chlorinator unit within the post-treatment tank. The accessability and ease-of-removal of the filter pipe assembly is important to the proper functioning of the ATPFP, since the filter pipe will need to be regularly removed for cleaning if the filter pipe is to continue performing its filtering/cleaning process effectively and if the unit is to function properly as a whole. Here, the compact design of the filter pipe itself, which combines a slender profile with a large surface area for trapping particles, is particularly helpful, in that it facilitates the convenient removal of the filter pipe from the post-treatment tank through the service hatch atop the riser.

The ATPFP can be made of any non-toxic, solid material, such as concrete, plastic, fibreglass, metal, or ceramic materials for example, but a strong, light-weight, non-corrosive material is preferable for convenience in installation and operation. Preferably, the ATPFP is formed of fibreglass reinforced plastic, keeping the weight of the ATPFP to that reasonable for simple installation without the need for lifting machinery. The tanks are typically joined together by a laminating process. Generally, the tanks are sized so that they do not have to be pumped clean very often, on average requiring cleaning once every two to five years. In addition, the sizes of the tanks are dependant upon the expected amount of sewage generated by the buildings they service on a daily basis. The aerobic tank must also be sized so that the sewage remains in it long enough for the aerobic microorganisms to effectively process the sewage. The ATPFP is typically installed below ground, buried in the yard of a residence, so its compact design simplifies installation and minimizes the amount of damage to the yard.

It is an object of this invention to clean sewage in preparation for discharge. In doing so, this invention uses an aerobic processes to break down the sewage, separates the contaminants from the sewage water through a gravity separation process, and filters and chlorinates the effluent. It is still another object of this invention for it to be easy to install and for it to be durable, requiring very little maintenance. It is yet another object of this invention to employ a filter pipe to trap particles floating in the effluent after aerobic clarification in order to produce a better quality effluent for discharge to the environment. It is yet another object of this invention to employ a filter pipe to trap trash and other debris so that the effluent may be pumped out of the post-treatment tank. It is yet another object of this invention to utilize a filter pipe design which facilitates regular removal and cleaning of the filter pipe in order to ensure that the filter pipe functions properly over time. It is yet another object of this invention to utilize a filter pipe design which maximizes the functional operating life of the filter element between regular cleanings by providing a filter with a large surface area. It is yet another object of this invention to provide a multi-stage sewage cleaning process in a single, compact unit. It is yet another object of this invention to discharge water which meets or exceeds state water quality requirements. It is yet another object of this invention to allow for inspection of the tanks and to allow for cleaning and maintenance of the invention.

BRIEF DESCRIPTION OF DRAWINGS

Reference will be made to the drawings where like parts are designated by like numerals and wherein.

DETAILED DESCRIPTION OF PREFERRED EMBODIMENT

Figure 1:
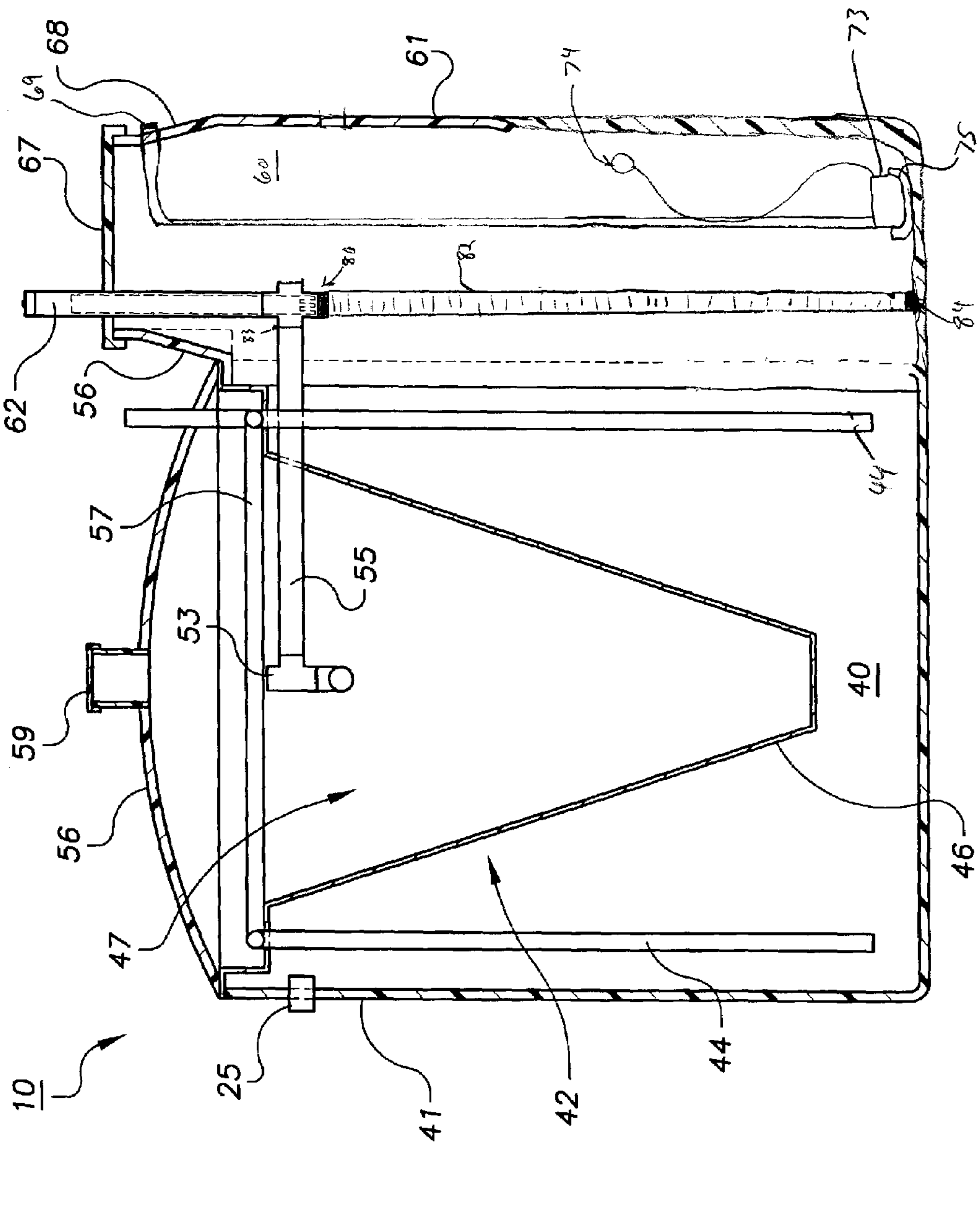
FIG. 1 is a cut-away side view of the ATPFP.
Figure 2:
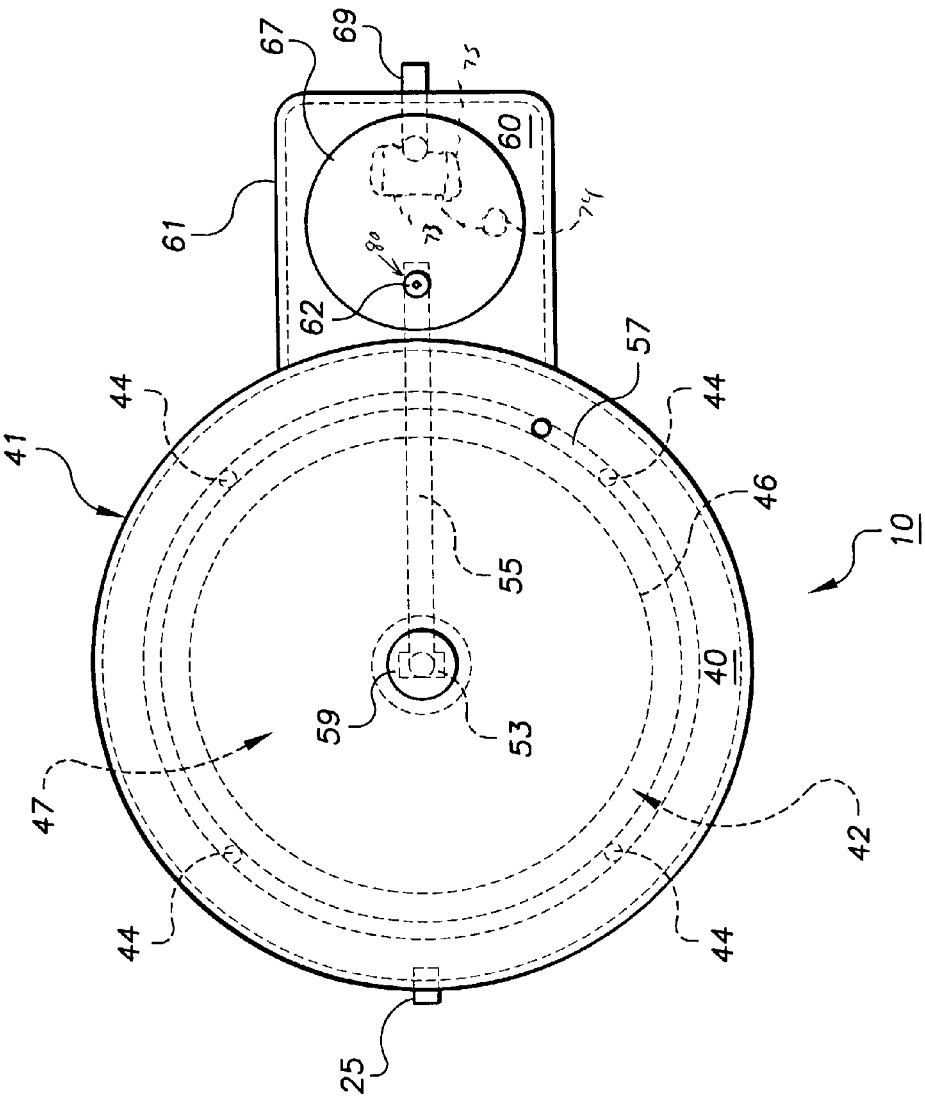
FIG. 2 is an overhead plan view of the ATPFP.

Referring now to the drawings in more detail, the preferred embodiment of the ATPFP is generally designated by the numeral 10, and is shown generally in FIG. 1 and FIG. 2.

The ATPFP 10 is comprised of two tanks which are rigidly joined together into a single unit. The main sewage treatment tank, which is generally the largest, is the aerobic tank 40. Although it may be any shape, the preferred embodiment is cylindrical with a closed bottom. Also, although the size of the aerobic tank 40 can vary depending upon the amount of sewage that the ATPFP 10 will likely receive in a given day, the aerobic tank 40 generally is sized to handle from 500 to 1500 gallons of sewage per day. The preferred embodiment of the ATPFP processes 500 gallons of sewage per day (as for a typical residence) and has a diameter of approximately 66 inches and a height of approximately 76 inches. The post-treatment tank 60 is generally smaller than the aerobic tank 40. The post-treatment tank 60 typically ranges in size from 37 to 300 gallons. In the preferred embodiment it holds approximately 166 gallons of effluent and has an approximately rectangular cross-section which is 24 inches by 26 inches. Again, the post-treatment tank 60 can have any shape so long as it has sidewalls and a bottom (so that it can contain the sewage), but in the preferred embodiment the post-treatment tank 60 is roughly rectangular in cross-section. The post-treatment tank 60 is rigidly attached to the aerobic tank 40, and in the preferred embodiment, the post-treatment tank 60 spans the entire height of the aerobic tank 40. Although the aerobic tank 40 and the post-treatment tank 60 can be made of any non-toxic, solid material, in the preferred embodiment of the ATPFP 10 both tanks 40 and 60 are formed of fibreglass reinforced plastic, with the post-treatment tank 60 laminated onto the aerobic tank 40 to create a single, one-piece ATPFP 10.

Each of the tanks in the ATPFP 10 must be covered. The cover can be an integrated part of the tank, but generally the cover is a separate, distinct component to simplify both construction and maintenance. The top of the tanks can be sealed by having a separate cover for the aerobic tank 40 and for the post-treatment tank 60, or a single cover can seal both tanks at once. In the preferred embodiment, a single cover 56 is used to cap the aerobic tank 40 and the post-treatment tank 60. The cover 56 must seal each tank from the other to prevent any flow of gases between the two stages of the ATPFP 10. Also, in the preferred embodiment the cover 56 has a convexly curved portion over the aerobic tank 40, as this convex design strengthens the cover 56 so that it can resist the downward forces applied on it when it is buried beneath the ground.

Figure 6:
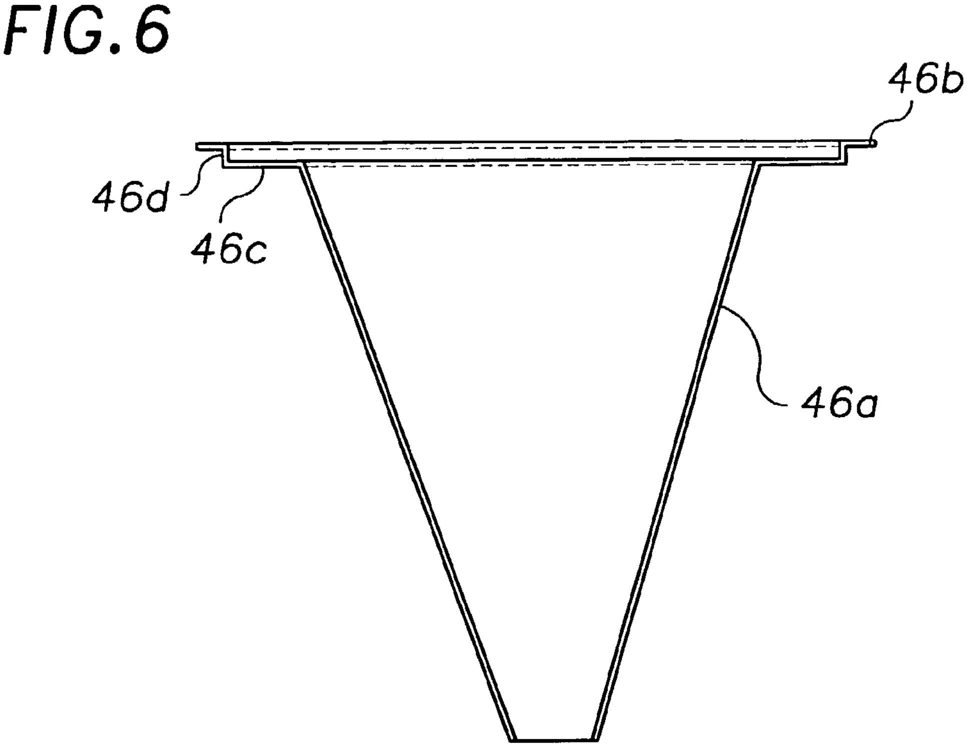
FIG. 6 is a cut-away side view of the clarifier of the ATPFP.
Figure 7:
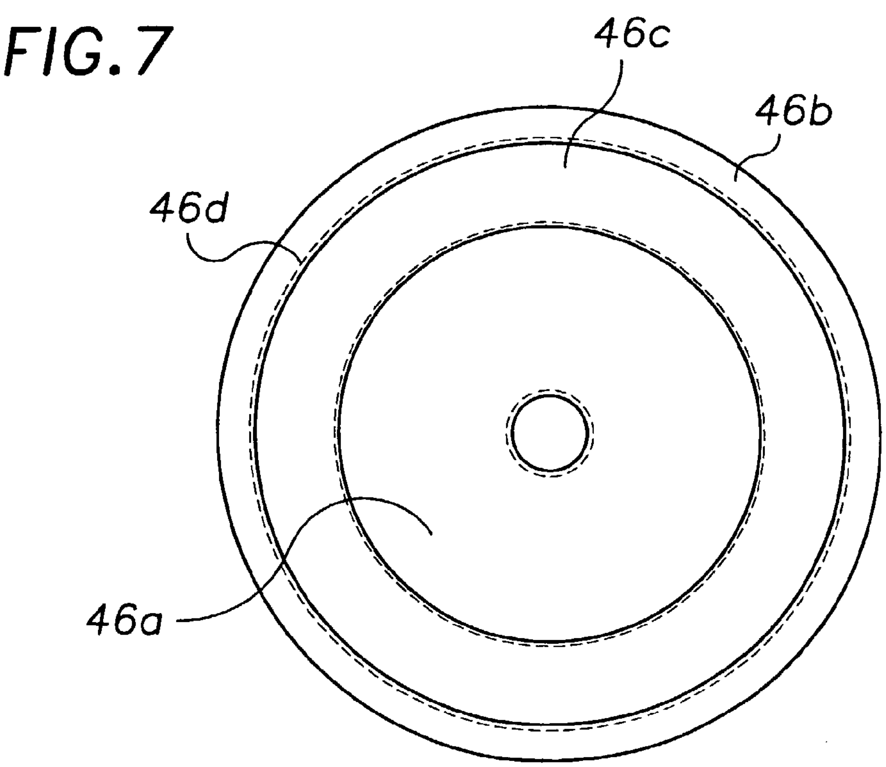
FIG. 7 is an overhead view of the clarifier of the ATPFP.

Sewage enters the aerobic tank 40 through an inlet port 25 generally located near the top of the aerobic tank 40. Within the aerobic tank 40 of the ATPFP 10, is a funnel-shaped clarifier 46. The clarifier 46 is wide near the top of the aerobic tank 40 and narrow near the bottom of the aerobic tank 40, with a hole in the bottom of the clarifier 46. The preferred embodiment uses a clarifier 46 design with a lip **46*b* that overhangs the sidewalls 41 of the aerobic tank 40 (see FIG. 6). Thus, the clarifier 46 actually hangs down from the top of the sidewalls 41. The lip 46*b* of the clarifier is held firmly in place between the top of the aerobic tank sidewalls 41 and the cover 56 for the aerobic tank 40. The funnel-shaped clarifier main body 46*a* is offset slightly down from the top of the tank, so that there is a gap between the top of the clarifier main body 46*a*** and the top of the aerobic tank

40. This offset 46*d* provides clearance for the air feed conduit 57. Also, in the preferred embodiment, the clarifier main body 46*a* is set slightly in radially from the sidewalls 41 of the aerobic tank 40, providing a rim 46*c* on which the air feed conduit 57 may lie. The clarifier 46 hangs downward in the aerobic tank 40, but does not extend all the way to the bottom of the aerobic tank 40; instead there is a gap between the bottom of the clarifier 46, which is the narrow end of the funnel, and the bottom of the aerobic tank 40. Thus, the clarifier 46 divides the aerobic tank 40 into two chambers.

The outer chamber 42 of the aerobic tank 40 is located between the sidewall 41 of the aerobic tank 40 and the clarifier 46. The inner chamber 47, is located inside the funnel-shaped clarifier 46. Located in the outer chamber 42 of the aerobic tank, are one or more air droplines 44 which hang down into the sewage from the top of the aerobic tank 40. These droplines 44 are conduits, generally capped at the bottom ends, with holes for emitting air bubbles. In the preferred embodiment, the droplines 44 are cylindrical conduits. The top ends of the plurality of droplines 44 are connected to an air feed conduit 57 which leads to an external air compressor. Thus, when the air compressor is operating, air flows through the air feed conduit 57, into the droplines 44, and bubbles out into the sewage in the outer chamber 42 of the aerobic tank 40. For best results, the droplines 44 should not emit air bubbles beneath the plane of the bottom of the clarifier 46. While this may be accomplished by restricting the length of the droplines 44 so that they do not extend down beneath the plane of the bottom of the clarifier 46, the preferred embodiment uses droplines 44 which extend down past the bottom of the clarifier 46 but which only have holes in the area above the bottom of the clarifier 46. There should be enough droplines 44 to adequately aerate the sewage in the upper part of the outer chamber 42, with two through eight generally required. The preferred embodiment uses four such droplines 44 which are evenly spaced in the area of the outer chamber 42.

Figure 4:
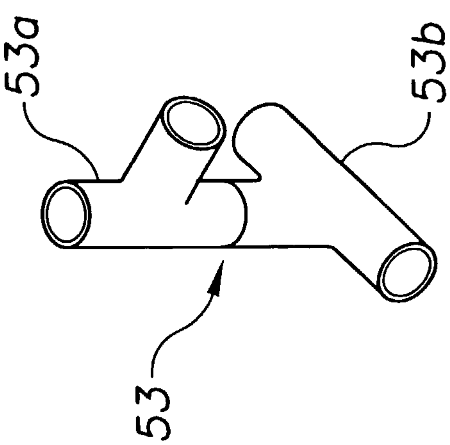
FIG. 4 is a perspective view of the T-Baffle of the ATPFP.

Located near the center of the inner chamber 47 near the top of the aerobic tank 40 is the T-Baffle 53. The T-Baffle 53 functions to draw cleaned effluent from near the top of the liquid surface level in the inner chamber 47 and to transport it through the outlet conduit 55 and into the post-treatment tank 60. The T-Baffle 53 is comprised of two T-joints 53*a* and 53*b* rigidly linked together (see FIG. 4). The lower T-joint 53*b* is located near the surface level, beneath the cleaned effluent so that cleaned effluent will enter through the two openings in the T-joint 53*b*. This lower T-joint 53*b* is rigidly attached to a branch of the upper T-joint 53*a*. One of the other branches of upper T-joint 53*a* extends up out of the effluent and acts as a vent. The third branch of the upper T-joint 53*a* is rigidly attached to the outlet conduit 55 which extends outward radially from the central location of the T-Baffle 53, through the outer sidewall 41 joining the aerobic tank 40 to the post-treatment tank 60, and into the post-treatment tank 60. Thus, the T-Baffle 53 and connected outlet conduit 55, which together are termed the outlet drain, transport effluent from the inner chamber 47 of the aerobic tank 40 into the post-treatment tank 60.

Figure 5:
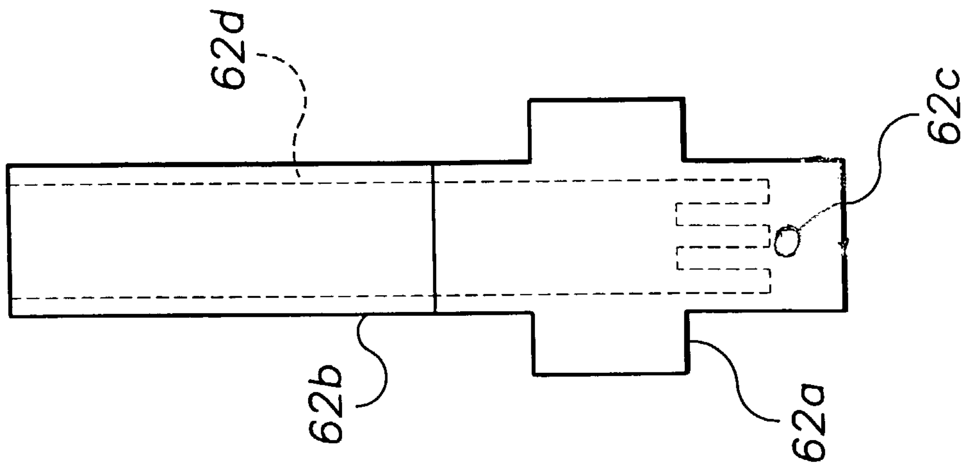
FIG. 5 is a side view of the chlorinator of the ATPFP.

In the post-treatment tank 60, the outlet conduit 55 from the aerobic tank 40 is connected to a filter pipe assembly 80. Although the filter pipe assembly 80 could be merely comprised of a filter pipe 82, in the preferred embodiment the filter pipe assembly 80 is comprised of an optional chlorinator 62 and a filter pipe 82. The filter pipe assembly 80 could connect these elements in a variety of ways and could utilize various specific types of chlorine dispersal units and filter units for trapping debris; the preferred embodiment set forth in detail below is intended to be merely illustrative and is not intended to limit the application or scope of this invention in any way. A person skilled in the art field will recognize and appreciate such equivalents, which are included within the scope of the ATPFP 10. The purpose of the chlorinator 62 is to distribute chlorine into the effluent. In the preferred embodiment, the chlorinator 62 distributes chlorine by physical contact of the effluent with chlorine tablets. The chlorinator 62 is comprised of a cross 62*a,* an external feeding conduit 62*b,* a restraining mechanism 62*c,* and a tablet droptube 62*d* (see FIG. 5). The restraining mechanism 62*c,* which is a rod (typically a ¾ inch PVC tube) affixed in the center of the bottom of the cross 62*a* in the preferred embodiment, acts as a stop to hold the tablet droptube 62*d* in place in the chlorinator 62, so that the effluent from the outlet conduit 55 will flow properly through the chlorinator 62 and will be effectively chlorinated before passing into the filter pipe 82. One branch of the cross 62*a* is removably connected to the outlet conduit 55 from the aerobic tank 40. Typically, this removable connection is accomplished by sliding said branch of the cross 62*a* onto the outlet conduit 55 and fixing the connection with a removable pin 83, which is inserted into matching holes in the cross 62*a* and the outlet conduit 55. Another branch of the cross 62*a* extends outward horizontally into the post-treatment tank 60. This branch of the cross 62*a* is open and acts as an overflow relief mechanism, in case the filter pipe 82 should ever become clogged by debris (as for example, if the filter pipe 82 was not timely cleaned, so that it filled completely with debris). The remaining branches of the cross 62*a* extend in the vertical plane, one branch extending upwards while the other extends downwards. To the upper branch of the cross 62*a* is connected an external feeding conduit 62*b* which extends upwards out of the post-treatment tank 60. It is through this external feeding conduit 62*b* that the chlorine tablets are administered.

Attached to the lower branch of the cross 62*a* is the filter pipe 82, which extends downward into the post-treatment tank 60, so that the effluent from the outlet conduit 55 may pass through the chlorinator 62 and through the filter pipe 82 before entering the post-treatment tank 60 in preparation for discharge to the environment. The filter pipe 82 may be either rigidly attached (with an adhesive, for example) or removably attached (with pins, for example) to the chlorinator 62. The restraining mechanism 62*c* is typically located near the interface between the chlorinator 62 and the filter pipe 82, so that the droptube 62*d* cannot enter the filter pipe but is held in its proper location so that the effluent may be effectively sanitized by the chlorinator 62. The chlorine tablets are loaded into the chlorine droptube 62*d,* which is a straight conduit that has a small enough diameter to fit into the external feeding conduit 62*b*. The chlorine droptube 62*d* is then placed in the external feeding conduit 62*c,* loading the chlorine into the chlorinator 62. The chlorine droptube 62*d* has holes or slots in it to allow effluent to pass through the sidewall of the chlorine droptube 62*d,* making contact with the chlorine tablet before exiting out the chlorinator 62.

Figure 3:
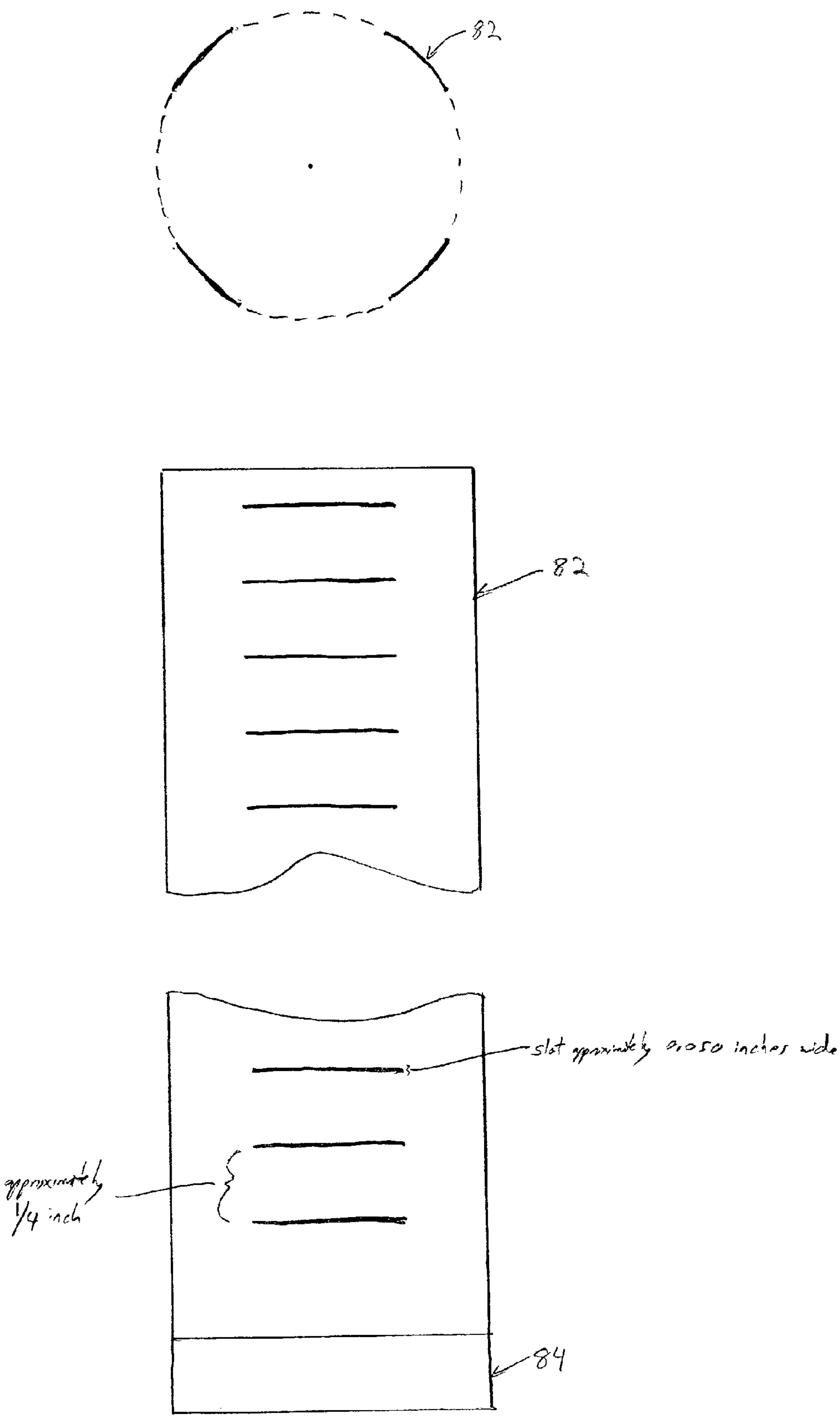
FIG. 3 is a combined overhead and side view of the filter pipe of the ATPFP.

The filter pipe 82, shown in FIG. 3, is a filter cleaning mechanism for trapping small particles and floating debris and trash still remaining in the effluent after the aerobic clarification cleaning process. The filter pipe 82 is designed to primarily trap hair, lent, and other such floating solids which have made it through the aerobic clarification process, while also reducing the small solid particulates in the effluent. In general design, the filter pipe 82 utilizes small apertures through which the effluent flows in order to trap solid particles floating in the effluent. These particles are held within the filter pipe 82, so that they may not pass through into the post-treatment tank 60. In the preferred embodiment, the filter pipe 82 is comprised of a slotted tube which is capped at the bottom end by a removable cap 84. Although various sizes and types of tubes could be utilized, the preferred embodiment employs a filter pipe 82 which is 4 inch PVC pipe with horizontal slots of approximately 0.050 inches in width cut along its length. In the preferred embodiment, four such slots are spaced evenly around the circumference of the filter pipe 82 at each location along its length, with slots being spaced evenly along the vertical length of the filter pipe 82 and typically having approximately ¼ inch of vertical distance between layers of slots. And in the preferred embodiment, the filter pipe 82 essentially spans the length of the post-treatment tank 60, such that when it is in place, it rests on the bottom of the post-treatment tank 60 for additional support. This particular design provides maximum filter surface area and effective radial distribution of effluent. Also, the design's length allows the ATPFP to be utilized for extended periods between cleanings. Finally, the design provides a slender profile for easy extraction of the filter pipe 82 when cleaning does become necessary. And if additional filtration is desired, it may easily be added to the ATPFP 10 by simply incorporating additional filter pipes 82 of varying radii which encompass the original filter pipe 82. These additional filter pipes 82 could have either the same size slots as the original filter pipe 82, or they could have narrower slots for more refined filtration. Thus, the filtration system of the ATPFP 10 can readily be modified as needed by simply adding radial layers of filter pipes 82.

Regardless of the number of layers of filter pipes 82, the basic filtration process remains the same. The effluent enters the top of the filter pipe 82 and flows out into the post-treatment tank 60 through the slots along the length of the filter pipe 82. Any particulate matter and debris in the effluent larger than the slots in the filter pipe 82 will be trapped inside the filter pipe 82 and will be unable to flow into the post-treatment tank 60 for discharge. Instead, the particulates will fall to the bottom of the filter pipe 82 and collect in the cap 84 at the bottom of the filter pipe 82. In this manner, the filter pipe 82 acts as both a filter and a trash trap. Thus, the greater the length of the filter pipe 82, the longer the permissible period of time between cleanings, since the filter pipe 82 will have additional space to store the trapped debris while still having ample unblocked slots for effluent to flow through on its way to the post-treatment tank 60. When it is time for the filter pipe 82 to be cleaned, the pin 83 can be removed, the cross **62*a* can be slidably disengaged from the outlet conduit 55, and the entire filter pipe assembly 80 can be easily removed through the service hatch 67 atop the riser 68 of the post-treatment tank 60. Then, the actual cleaning of the filter pipe 82 can quite easily take place by simply removing the cap 84 from the bottom of the filter pipe 82 and flushing the particulate matter and debris out of the filter pipe 82. Because of the length of the filter pipe 82**, clogging should not become an issue so long as the standard six month regular maintenance schedule is observed and the system is not severely abused.

The single cover 56 which acts to seal both tanks 40 and 60 of the ATPFP 10 has various openings, risers, and hatches built into it. Over the aerobic tank 40, an inspection riser 59 extends up above ground level. Over the post-treatment tank 60, a post-treatment tank riser 68 extends up above ground level. This post-treatment tank riser 68 has a service hatch 67 for regular cleaning and maintenance of the filter pipe 82. The post-treatment tank riser 68 and service hatch 67 are both sized to allow for easy access to the filter pipe assembly 80 for maintenance and/or cleaning purposes, as well as for installation and maintenance of an internal pump 73, which may be located within the post-treatment tank 60. Preferably, a float switch 74 in the post-treatment tank 60 activates an internal pump 73 when the effluent in the post-treatment tank reaches a certain level. In the case of an internal pump 73, a pump seat 75 can be rigidly attached to the bottom of the post-treatment tank 60 to minimize pump movement and stress on the pump line. The effluent is generally pumped out of the post-treatment tank riser 68 through an outlet port 69 drilled in the post-treatment tank riser 68 at the time of installation.

The invention described above employs a multi-stage procedure for cleaning raw sewage. The raw sewage enters the aerobic tank 40 through the inlet port 25, which has a sealant around it to prevent any leakage. As more sewage enters the aerobic tank 40 through the inlet port 25, sewage is displaced downward in the outer chamber 42 and passes through the air bubbles emitted from the droplines 44. These air bubbles aerate the sewage, stimulating the aerobic microorganisms so that the aerobic processing of the sewage is greatly enhanced. As the sewage continues to descend in the outer chamber 42, the sewage exits this aeration zone where the air bubbles are emitted by the droplines 44 and enters a quiescent zone near the bottom of the aerobic tank 40. In this quiescent zone, the solid contaminants suspended in the effluent begin to fall towards the bottom of the aerobic tank 40 under the influence of gravity. As more sewage enters the outer chamber 42 from the inlet port 25, the aerated sewage in the quiescent zone near the bottom of the aerobic tank 40 is pushed up into the inner chamber 47 inside the clarifier 46. The inner chamber 47 is protected by the walls of the clarifier 46 from the stirring effect of the air bubbles emitted from the droplines 44 in the outer chamber 42, so the inner chamber 47 is a zone of relative calm. As the sewage continues to rise upward through the inner chamber 47, the force of gravity continues to pull down the heavier solid contaminants. Thus, the inner chamber 47 acts as a gravity separator, continually segregating the contaminants from the effluent, so that by the time the treated sewage reaches the top of the inner chamber 47, the effluent has been substantially cleaned. Again, the size of the outer chamber 42 and the inner chamber 47 of the aerobic tank 40 are selected based upon the typical amounts of sewage to be processed so that each chamber has sufficient time to perform its cleaning function.

As the treated effluent nears the top of the inner chamber 47, it enters the two bottom openings in the T-Baffle 53. The effluent then flows through the outlet conduit 55, passing out of the inner chamber 47, through the clarifier 46, through the outer chamber 42, through the sidewall 41 of the aerobic tank 40 where it is adjacent to the post-treatment tank 60, and into the post-treatment tank 60. At the point where the outlet conduit 55 passes through the clarifier 46 and the side wall of the aerobic tank 40, a sealant ensures that there is no leakage. In the post-treatment tank 60, the outlet conduit 55 removably connects to the filter pipe assembly 80. In the preferred embodiment, the filter pipe assembly 80 is comprised of a chlorinator 62 and a filter pipe 82. Although a person skilled in the art field will appreciate that there are several different ways in which the filter pipe assembly could join a chlorination unit of some type to a filtering mechanism of some type, in the preferred embodiment, the filter pipe assembly 80 is constructed so that the filter pipe 82 is attached to the bottom of the chlorinator 62, so that the effluent is chlorinated and then filtered before being released into the post-treatment tank 60. Thus, the effluent flows into the cross 62*a* of the chlorinator 62, passes through holes in the chlorine droptube 62*d* to flow across a chlorine tablet, and then flows down through the inside of the droptube 62*d* and through the restraining mechanism 62*c* to exit the chlorinator 62, chlorinating the effluent before it enters the filter pipe 82. The effluent then flows into the filter pipe 82 and through the slots in the filter pipe 82 into the post-treatment tank 60. In the preferred embodiment, the chlorinator 62 uses chlorine tablets designed to ensure that the chlorine content in the effluent passing across it will be at least 1 ppm. Although a variety of means could be used to discharge the cleaned effluent from the post-treatment tank 60, in the preferred embodiment an internal pump 73 activated by a float switch 74 discharges the cleaned effluent into the environment. The treated effluent is stored in the post-treatment tank 60 until the level of effluent rises high enough to activate a float switch 74 on the internal pump 73. At that point, the internal pump 73 activates and pumps the treated effluent out of the post-treatment tank 60 through the outlet port 69, discharging the now cleaned effluent.

As stated above, the preferred embodiment uses fibreglass reinforced plastic for the tanks 40 and 60, the clarifier 46, and the cover 56. This material selection allows the ATPFP 10 to be relatively light-weight, for ease-of-installation, yet durable. A strong, lightweight plastic would also be effective. The pipes, conduits, and T-joints in the preferred embodiment can also be made of any non-toxic, solid material, but the preferred embodiment uses commercially available PVC components since they are durable and light-weight and since their ready availability simplifies the manufacturing process. In addition, since each tank needs to be sealed to prevent transfer of liquids or gases between them and to prevent leakage of untreated sewage out of the ATPFP 10, sealant material is used wherever a conduit, pipe, or port passes through a separating wall. Generally, the tanks are sized appropriately depending on the expected sewage production rate of the buildings serviced by the ATPFP 10, with the size of the aerobic tank 40 being most critical to the sewage cleaning process since the aerobic microorganisms must be given sufficient time to process the sewage. In the preferred embodiment, the aerobic tank 40 processes approximately 500 gallons per day, while the post-treatment tank 60 holds approximately 166 gallons of effluent for discharge.

In the aerobic tank 40, the size of the gap between the opening in the bottom of the clarifier 46 and the bottom of the aerobic tank 40 should be big enough to allow for a good flow of sewage from the outer chamber 42 of the aerobic tank 40 into the inner chamber 47. In the preferred embodiment, the gap is approximately 10 inches. In addition, in the preferred embodiment the offset from the top of the aerobic tank 40 to the top of the clarifier main body 46*a* is approximately 2 inches. Also, the clarifier rim 46*c* in the preferred embodiment is approximately 9 inches.

Although the size, number, and distribution of air holes in the air droplines 44 can vary, the air holes should be as small as possible without clogging regularly in operation, since this will allow for good air diffusion into the sewage while allowing the ATPFP 10 to operate reliably. In the preferred embodiment the holes are 3⁄16th of an inch in diameter. Each dropline 44 in the preferred embodiment has three vertical columns of holes spaced 3⁄8th of an inch apart facing towards the clarifier 46 and running down the length of each dropline 44 from near the top of the aerobic tank 40 and ending just above the plane of the opening in the bottom of the clarifier 46. In the preferred embodiment, there are 13 holes in each dropline 44, with the holes in each column spaced 3⁄4th of an inch apart.

What we claim is:

1. A device comprising:

a cylindrical aerobic tank and a post-treatment tank;

wherein said aerobic tank and said post-treatment tank are rigidly joined into a single unit and are connected in series so that sewage flows from said aerobic tank to said post-treatment tank;

wherein said aerobic tank further comprises a clarifier that divides said aerobic tank into an inner chamber and an outer chamber, one or more air droplines located within said outer chamber of said aerobic tank, and an outlet drain located within said inner chamber of said aerobic tank, wherein said post-treatment tank further comprises a chlorinator and a filter pipe, wherein said clarifier further comprises:

a funnel-shaped main body with top and bottom openings, a lip around the top of said main body by which said clarifier overhangs the top of said aerobic tank, and an offset wherein said clarifier main body is held slightly below the level of said lip and whereby the top of said main body of said clarifier is slightly below the top of said aerobic tank; and wherein said one or more air droplines emit air bubbles in said outer chamber of said aerobic tank at or above the level of the plane of the bottom of said clarifier.

2. A device as in claim 1 wherein said chlorinator and filter pipe further comprises a means for removably attaching said filter pipe to said outlet drain.

3. A device as in claim 2 wherein said filter pipe further comprises a tube which is capped at its bottom end and which has apertures located along its length.

4. A device as in claim 3;

wherein said apertures along the length of said filter pipe are horizontal slots approximately less than 0.050 inches wide which are spaced around the circumference of said filter pipe and are spaced along the vertical length of said filter pipe approximately 1⁄4 inch apart vertically; and wherein said filter pipe extends from approximately the height of said outlet drain to the bottom of said post-treatment tank.

5. A device as in claim 1 wherein said filter pipe further comprises a means for removably attaching said filter pipe to said outlet drain;

wherein said filter pipe further comprises a tube which is capped at its bottom end and which has apertures located along its length;

wherein said apertures along the length of said filter pipe are horizontal slots approximately less than 0.050 inches wide which are spaced around the circumference of said filter pipe and are spaced along the length of said filter pipe approximately 1⁄4 inch apart vertically; and wherein said filter pipe extends from approximately the height of said outlet drain to the bottom of said post-treatment tank.

6. A device comprising:

a cylindrical aerobic tank and a post-treatment tank;

wherein said aerobic tank and said post-treatment tank are rigidly joined into a single unit and are connected in series so that sewage flows from said aerobic tank to said post-treatment tank; and wherein said post-treatment tank further comprises a chlorinator, filter pipe and a pump;

wherein said aerobic tank further comprises a funnel-shaped clarifier that divides said aerobic tank into an inner chamber and an outer chamber, one or more air droplines located within said outer chamber of said aerobic tank, and an outlet drain located within said inner chamber of said aerobic tank, wherein said filter pipe further comprises a means for removably attaching said filter pipe to said outlet drain;

wherein said filter pipe further comprises a tube and a cap; wherein said tube has apertures located along its length and said cap removably attaches to said tube.

7. A device as in claim 6 wherein said apertures along the length of said filter pipe are horizontal slots approximately less than 0.050 inches wide which are spaced around the circumference of said filter pipe and are spaced along the vertical length of said filter pipe approximately ¼ inch apart vertically.

8. A device as in claim 7 wherein said filter pipe extends from approximately the height of said outlet drain to the bottom of said post-treatment tank.

9. A device as in claim 6 wherein said apertures along the length of said filter pipe are horizontal slots approximately less than 0.050 inches wide.

10. A device as in claim 9 wherein said chlorinator further comprises a cross with four branches, an external feeding conduit, a restraining mechanism, and a chlorine tablet droptube.

11. A device as in claim 10 wherein said restraining mechanism further comprises a rod;

wherein one of said horizontal branches of said cross of said chlorinator is removably attached to said outlet drain, said external feeding conduit is rigidly attached to said upper vertical branch of said cross of said chlorinator, said droptube is located within said external feeding conduit, said lower vertical branch of said cross of said chlorinator is rigidly attached to the top of said filter pipe, and said rod is rigidly located within said lower vertical branch of said cross of said chlorinator, so that effluent flows from said inner chamber of said aerobic tank, through said outlet drain, into said chlorinator, where it contacts any chlorine tablets loaded into said droptube, down past said rod into said filter pipe, where any debris is captured, and out through said apertures in said filter pipe into said post-treatment tank.

12. A device as in claim 11 wherein said post-treatment tank further comprises a float switch which activates said pump whenever the effluent level within said post-treatment tank rises above a pre-set level.

13. A device as in claim 11 wherein said aerobic tank and said post-treatment tank are comprised of fibreglass and are laminated together, and wherein a single cover seals both said aerobic tank and said post-treatment tank.

14. A device comprising a post-treatment tank for use as part of a multi-stage sewage cleaning process, wherein said post-treatment tank further comprises an effluent inlet, a riser, a chlorinator and filter pipe, and a pump, wherein said filter pipe further comprises a means for removably attaching said filter pipe to said effluent inlet; wherein said filter pipe further comprises a tube which is capped at its bottom end and which has apertures located along its length.

15. A device as in claim 14 wherein said apertures along the length of said filter pipe are horizontal slots approximately less than 0.050 inches wide which are spaced around the circumference of said filter pipe and are spaced along the vertical length of said filter pipe approximately ¼ inch apart vertically.

16. A device as in claim 15 wherein said filter pipe extends from approximately the height of said outlet drain to the bottom of said post-treatment tank.

17. A device as in claim 15 further comprising an aerobic tank, wherein said aerobic tank and said post-treatment tank are rigidly joined into a single unit and are connected in series so that sewage flows from said aerobic tank to said post-treatment tank.

18. A device as in claim 16 further comprising an aerobic tank, wherein said aerobic tank and said post-treatment tank are rigidly joined into a single unit and are connected in series so that sewage flows from said aerobic tank to said post-treatment tank.

19. A device comprising an aerobic tank and a chlorinator and a filter pipe;

wherein said aerobic tank is essentially cylindrical in shape and further comprises a funnel-shaped clarifier that divides said aerobic tank into an inner chamber and an outer chamber, one or more air droplines located within said outer chamber of said aerobic tank, and an outlet drain located within said inner chamber of said aerobic tank;

wherein said filter pipe further comprises a means for removably attaching said filter pipe to said outlet drain;

wherein said filter pipe further comprises a tube and a cap;

wherein said tube has apertures located along its length and said cap removably attaches to said tube;

wherein said apertures along the length of said filter pipe are horizontal slots approximately less than 0.050 inches wide which are spaced around the circumference of said filter pipe and are spaced along the vertical length of said filter pipe approximately ¼ inch apart vertically; and wherein said filter pipe extends from approximately the height of said outlet drain to the bottom of said post-treatment tank.

20. A device comprising a post-treatment tank for use as part of a multi-stage sewage cleaning process;

wherein said post-treatment tank further comprises an effluent inlet, a chlorinator, a filter pipe, and a pump;

wherein said filter pipe further comprises a means for removably attaching said filter pipe to said effluent inlet;

wherein said filter pipe further comprises a tube which is capped at its bottom end and which has apertures located along its length; and wherein said apertures are sufficiently small to filter particulates remaining in sewage after initial cleaning stages of said multi-stage sewage cleaning process.

21. A device as in claim 20 wherein said apertures are sized to filter particulates larger than approximately 0.05 inches in diameter.

22. A device as in claim 21 wherein said apertures are spaced around the circumference of said filter pipe.

23. A device as in claim 21 wherein said apertures are spaced along the vertical length of said filter pipe approximately ¼ inch apart vertically.

24. A device as in claim 22 wherein said apertures are spaced along the vertical length of said filter pipe approximately ¼ inch apart vertically.

* * * * *